No. 738,555. PATENTED SEPT. 8, 1903.
C. LOEWE.
GUIDE BOOK FOR STREETS, RAILROADS, RIVERS, OR THE LIKE.
APPLICATION FILED JUNE 12, 1902.
NO MODEL.

Witnesses.

Inventor:
Carl Loewe
by Richards Co.
Attys

No. 738,555. Patented September 8, 1903.

UNITED STATES PATENT OFFICE.

CARL LOEWE, OF BERLIN, GERMANY.

GUIDE-BOOK FOR STREETS, RAILROADS, RIVERS, OR THE LIKE.

SPECIFICATION forming part of Letters Patent No. 738,555, dated September 8, 1903.

Application filed June 12, 1902. Serial No. 111,409. (No model.)

*To all whom it may concern:*

Be it known that I, CARL LOEWE, Dr. Juris., a subject of the Emperor of Germany, residing at Berlin, in the Empire of Germany, have invented a new and useful Guide-Book for Streets, Railroads, Rivers, or the Like, of which the following is a specification.

My invention relates to improvements in street guide-books in which the several streets or parts of same are separately represented on the pages in such a manner that the street is placed about in the middle of the page, while of the crossing streets only the adjoining ends are represented; and the objects of my improvement are, first, to place the street not in the middle of a page, but in the fold where two neighboring pages adjoin, so that the thread for binding the book or the wire clamps for stitching it are passed through the center line of the street instead of on the right or left edge of the street plan, as hitherto; second, to indicate the various tram and omnibus lines passing through the street in a special manner, so as to enable the reader to recognize the proper cars which he chooses to use, and, third, to adapt the guide-book equally to railroads, rivers, and similar courses of traffic.

The improved guide-book as used for streets is diagrammatically illustrated on the accompanying drawings, in which—

Figure 1:
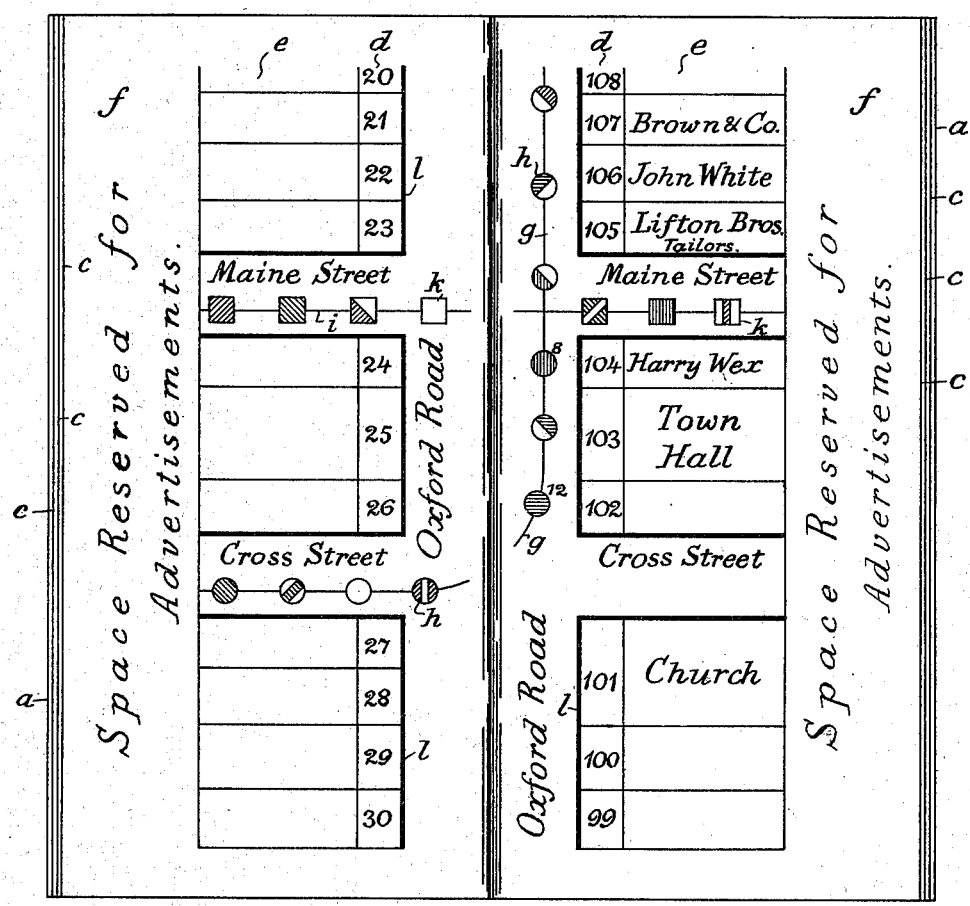
Figure 2:
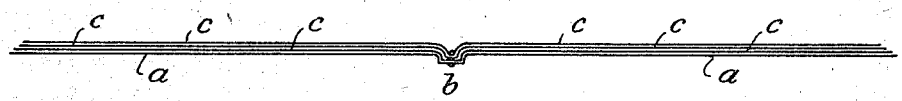

Figure 1 is a plan of the book in an opened state, and Fig 2 is an elevation of the same.

Similar letters of reference refer to similar parts throughout the two views.

For the sake of clearness the book is assumed to have only a cover $a$ and six sheets $c$, of which three are shown on the right-hand side and three on the left-hand side. On two adjoining pages (shown in Fig. 1) a street plan is shown, which is made on an exaggerated scale in order to better explain the invention. The street shown (here "Oxford road") is placed over the back $b$, so that the thread or wire used for binding the book is passed through the center line of this street. Of the crossing streets (here "Main street" and "Cross street") only the adjoining ends are represented. Along the street columns $d\ d$ are preferably printed for showing the house-numbers. The columns $e\ e$, adjoining thereto, may be used for showing the firms occupying the respective houses or for indicating the names of public buildings ("Town Hall," "Church," and so on.) Where it is so preferred, any figures, notices, and the like may be printed in these spaces $e\ e$ on convenient places. I have shown the middle blocks as comprising only three buildings, (24 25 26 on the left and 102 103 104 on the right;) but it will be understood that in reality as many houses may be indicated as there are. The new arrangement of the street above the back $b$ affords special advantages. First of all, the street plan will be clearer than hitherto. The street shown being of sufficient width, it will now be possible to place therein the tram lines and omnibus lines passing through the street instead of at the bottom or lateral edges of the plan, as hitherto. There will be ample spaces $f\ f$ left for advertisements. The book can be safely reduced to a convenient size for being carried in a pocket, even in one in the waistcoat. The tram and omnibus lines passing through the street are according to my invention indicated by lines $g$ and $i$, with inserted circles $h$ and squares $k$ or other mathematical figures. To these figures suitable numbers, such as 8 and 12 in Fig. 1, may be added or they may be replaced by the latter. Preferably the lines $g$ and $i$ are printed in some color, so as to distinguish them from the lines $l\ l$ indicating the streets. The circles $h$, squares $k$, or other mathematical figures are preferably printed with diagonals, marks, and colors in correspondence with the shape, color, and other marks of the tables actually placed on the cars of the various tram and omnibus lines. Then the reader will at once recognize the car which he is desirous of using. Of course in the neighborhood of the circles $h$, squares $k$, or other mathematical figures employed the names of the respective lines or their abbreviations may be printed to enable the reader to select the respective line. If any railroads, rivers, channels, and the like should cross the street or run through or near it, they may be preferably indicated by suitable lines, marks, or colors and the like. The street guide-book may contain as many sheets as may be desired. The same street, according to its length, may be represented on one pair only or on several consecutive pairs of pages. A plurality of the pages of the book may be reserved for other notices or purposes. A plan of the town may be joined to the book, as usually.

It is obvious that the guide-book may be adapted for railroads, rivers, and other courses of traffic in a similar manner as is shown for streets. If the guide-book be used for railroads, the railroad is placed over the back *b* and of any branches the adjoining ends are shown. The houses represented in the street guide-book may then be replaced by mountains, villages, towers, or other remarkable objects which it is intended to point out. Of course the stations and other buildings in connection with the railroad will be required to be shown and marked in any suitable manner. If the guide-book be used for rivers, of course the river will again be placed over the back *b*. Otherwise the arrangement may be as indicated above for the railroad guide-book. In a similar manner the guide-book may be adapted for other courses of traffic.

I am aware that prior to my invention street guide-books have been made with a street plan on each page, and I therefore do not claim such a street guide-book broadly; but What I do claim as my invention, and desire to secure by Letters Patent, is—

1. A guide-book having one street located centrally over the back of the book, extending along the same longitudinally and receiving the stitching and with means indicating the ends of the adjoining streets or routes, substantially as described.

2. A guide-book having the indication of one street arranged centrally over the back running longitudinally thereof and receiving the stitching, means indicating the adjoining streets or routes and lines running through the streets intersected with signs indicating the character of the conveyance or conveyances following the said lines substantially as described.

In witness whereof I have hereunto set my hand in presence of two witnesses.

CARL LOEWE.

Witnesses:
FRITZ V. KELLER,
HENRY HASPER.